United States Patent
Miyamura et al.

(10) Patent No.: US 9,597,678 B2
(45) Date of Patent: Mar. 21, 2017

(54) INORGANIC ION ADSORBENT AND METHOD FOR PRODUCING SAME

(71) Applicant: TOAGOSEI CO., LTD., Tokyo (JP)

(72) Inventors: Kentarou Miyamura, Nagoya (JP); Yasuharu Ono, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 14/783,601

(22) PCT Filed: Mar. 26, 2014

(86) PCT No.: PCT/JP2014/058556
§ 371 (c)(1),
(2) Date: Oct. 9, 2015

(87) PCT Pub. No.: WO2014/168005
PCT Pub. Date: Oct. 16, 2014

(65) Prior Publication Data
US 2016/0082428 A1    Mar. 24, 2016

(30) Foreign Application Priority Data
Apr. 12, 2013 (JP) ................. 2013-083514

(51) Int. Cl.
*B01J 39/10*    (2006.01)
*G21F 9/12*    (2006.01)
(Continued)

(52) U.S. Cl.
CPC .............. *B01J 39/10* (2013.01); *C01G 19/02* (2013.01); *C01G 30/005* (2013.01); *G21F 9/12* (2013.01);
(Continued)

(58) Field of Classification Search
CPC ........ B01J 39/10; C01G 30/005; C01G 19/02; G21F 9/12; C01P 2006/12; C01P 2002/72
See application file for complete search history.

(56) References Cited

FOREIGN PATENT DOCUMENTS

| JP | 47-20465 B | 6/1972 |
|---|---|---|
| JP | 3-50117 A | 3/1991 |

(Continued)

OTHER PUBLICATIONS

"Questions and Comments about Fukushima Daiichi Nuclear Power Plant", Apr. 26, 2011, Division of Quantum Science and Engineering, Graduate School of Engineering, Hokkaido University [retrieved Mar. 29, 2013], Internet URL:http://www2.qe.eng.hokudai.ac.jp/nuclear-accident/reactor/pdf/Q_and_A-14-detail.pdf.

(Continued)

*Primary Examiner* — Anthony J Zimmer
(74) *Attorney, Agent, or Firm* — Birch, Stewart, Kolasch & Birch, LLP

(57) ABSTRACT

An inorganic ion adsorbent represents by Formula (1) below, wherein in powder X-ray diffraction measurement using CuKα radiation, the diffraction intensity of tetragonal tin oxide is at least 3% relative to the diffraction intensity of antimony pentoxide ($Sb_2O_5 \cdot 2H_2O$), and the diffraction intensity of cubic antimony pentoxide is no greater than 40% relative to the diffraction intensity of antimony pentoxide ($Sb_2O_5 \cdot 2H_2O$), $$SnO_2 \cdot a Sb_2O_5 \cdot n H_2O \quad (1)$$

wherein in the Formula, a denotes a number that satisfies $0.2 \leq a \leq 4$ and n denotes hydration number and is 0 or a positive number.

4 Claims, 5 Drawing Sheets

(51) Int. Cl.
*C01G 19/02* (2006.01)
*C01G 30/00* (2006.01)

(52) U.S. Cl.
CPC ...... *C01P 2002/72* (2013.01); *C01P 2006/12* (2013.01)

(56) References Cited

FOREIGN PATENT DOCUMENTS

| | | | |
|---|---|---|---|
| JP | 5-100083 A | 4/1993 |
| JP | 7-185322 A | 4/1993 |

OTHER PUBLICATIONS

Burham et al., "Synthesis and characterization of tin(IV) antimonate and study of its ion-exchange equilibria", Journal of Radioanalytical and Nuclear Chemistry, 1995, vol. 189, No. 1, pp. 89-99.
International Search Report, issued in PCT/JP2014/058556, dated May 13, 2014.
Koivula at al., "Structure and ion exchange properties of tin antimonates with various Sn and Sb contents", Microporous and Mesoporous Materials, 2002, vol. 55, No. 3, pp. 231-238.

INORGANIC ION ADSORBENT AND METHOD FOR PRODUCING SAME

TECHNICAL FIELD

The present invention relates to an inorganic ion adsorbent that has heat resistance and radiation resistance together with excellent properties in terms of adsorbing heavy metal ions such as Cr, Mn, Co, and Ni ions in particular, and a method for producing same.

BACKGROUND ART

Since inorganic ion exchangers are excellent in terms of heat resistance and radiation resistance compared with ion exchange resins, their application to the ion exchange treatment, separation, concentration, and purification of strongly radioactive substances, etc. in high temperature water has been expected for a long time. Among them, antimony pentoxide [$Sb_2O_5 \cdot kH_2O$ (here, k is a positive number of 4 or less)], tin antimonate [$SnO_2 \cdot bSb_2O_5 \cdot lH_2O$ (here, b is a positive number and l is 0 or a positive number)], titanium antimonate [$TiO_2 \cdot cSb_2O_5 \cdot mH_2O$ (here, c is a positive number of 0.6 or less and m is 0 or a positive number)], etc. have been considered to be promising, and various studies have been carried out (e.g. Patent Documents 1, 2, 3, and 4).

PRIOR ART DOCUMENTS

Patent Documents

Patent Document 1: JP-B-47-020465 (JP-B denotes a Japanese examined patent application publication)
Patent Document 2: JP-A-03-050117 (JP-A denotes a Japanese unexamined patent application publication)
Patent Document 3: JP-A-05-100083
Patent Document 4: JP-A-07-185322

Non-Patent Documents

Non-Patent Document 1: "Questions and Comments about Fukushima Daiichi Nuclear Power Plant", 26, Apr., 2011, Division of Quantum Science and Engineering, Graduate School of Engineering, Hokkaido University [retrieved 29 Mar., 2013], Internet <URL:http://www2.qe.eng.hokudai.ac.jp/nuclear-accident/reactor/pdf/Q_and_A-14-detail.pdf>

SUMMARY OF THE INVENTION

Problems to be Solved by the Invention

However, the inorganic ion exchangers described in Patent Documents 1 to 4 are mainly used for the separation of alkali metal ions such as Cs or Sr, and there is no disclosure regarding an inorganic ion exchanger that is suitable for the separation of heavy metal ions in particular. Furthermore, in recent years, there has been a desire for an inorganic ion exchanger that can efficiently separate divalent and trivalent heavy metal radioactive nuclides such as Co-60 Mn-54, Cr-51, and Ni-63, which are generated from ferrous materials of a nuclear power plant (Non-Patent Document 1).

It is an object of the present invention to provide an inorganic ion adsorbent that has excellent properties in terms of adsorbing heavy metal ions such as Cr, Mn, Co, and Ni ions in particular compared with a conventional antimony compound, and a method for producing same.

Means for Solving the Problems

The present inventors have found that a specific tin antimonate (a mixture of antimonic acid and stannic acid) that has a tetragonal tin oxide crystal structure and has little cubic antimony pentoxide structure has excellent properties in terms of adsorbing heavy metal ions such as Cr, Mn, Co, and Ni ions. It has also been found that a tin antimonate represented by Formula (1) is obtained in a stable state by mixing a mixed solution of tin and antimony at a specific ratio with water so as to give a specific concentration and then carrying out thermal aging, and the present invention has thus been accomplished.

That is, the inorganic ion adsorbent related to the present invention is as follows.

1. An inorganic ion adsorbent represented by Formula (1) below, wherein in powder X-ray diffraction measurement using CuKα radiation, the diffraction intensity of tetragonal tin oxide is at least 3% relative to the diffraction intensity of antimony pentoxide ($Sb_2O_5 \cdot 2H_2O$), and the diffraction intensity of cubic antimony pentoxide is no greater than 40% relative to the diffraction intensity of antimony pentoxide ($Sb_2O_5 \cdot 2H_2O$),

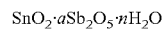

$$SnO_2 \cdot aSb_2O_5 \cdot nH_2O \qquad (1)$$

wherein in the Formula, $a$ denotes a number that satisfies $0.2 \leq a \leq 4$ and n denotes hydration number and is 0 or a positive number.

2. The inorganic ion adsorbent according to 1 above, wherein the specific surface area measured by a BET method is at least 100 m²/g.
3. A method for producing the inorganic ion adsorbent according to 1 or 2 above, the method comprising a precipitation step of forming a precipitate by mixing water and an aqueous solution comprising a tetravalent tin salt and a pentavalent antimony salt, and an aging step of carrying out aging by heating, wherein the molar ratio (Sn/Sb) of Sn in the tin salt and Sb in the antimony salt is 0.1 to 5, and in the precipitation step at least 100 times by mole of water is mixed relative to the total number of moles of Sn and Sb.
4. The method for producing an inorganic ion adsorbent according to 3 above, wherein the temperature in the aging step is at least 50° C.

MODE FOR CARRYING OUT THE INVENTION

Figure 1:
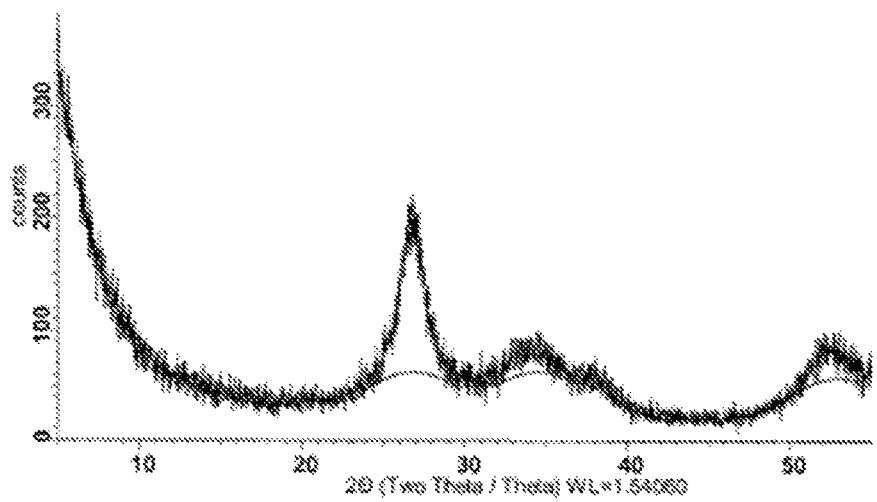
FIG. 1: An X-ray diffraction pattern of an inorganic ion adsorbent produced in Example 1.

One embodiment of the present invention is explained as follows, but the present invention should not be construed as being limited thereto.

1. Inorganic Ion Adsorbent

The inorganic ion adsorbent related to the present invention is one represented by Formula (1) below, wherein in powder X-ray diffraction measurement using CuKα radiation the diffraction intensity of tetragonal tin oxide is at least 3% relative to the diffraction intensity of antimony pentoxide ($Sb_2O_5 \cdot 2H_2O$), and the diffraction intensity of cubic antimony pentoxide is no greater than 40% relative to the diffraction intensity of antimony pentoxide ($Sb_2O_5 \cdot 2H_2O$).

$$SnO_2 \cdot aSb_2O_5 \cdot nH_2O \qquad (1)$$

In the Formula above, $\underline{a}$ is a numeral that satisfies $0.2 \leq \underline{a} \leq 4$. $\underline{a}$ is preferably $0.3 \leq \underline{a} \leq 3.8$, and more preferably $0.4 \leq \underline{a} \leq 3.5$. When $\underline{a}$ is less than 0.2 or $\underline{a}$ exceeds 4, the ion adsorbability deteriorates significantly. Furthermore, n denotes hydration number and is 0 or a positive number.

It is possible to confirm by powder X-ray diffraction analysis that the inorganic ion adsorbent of the present invention has the structure above. The powder X-ray diffraction analysis may be carried out in accordance with for example the provisions of JIS K0131 (General rules for X-ray diffraction analysis, enacted in 1996). These JIS provisions do not prescribe the applied voltage of the X-ray tube, but a standard measurement method carries out X-ray diffraction measurement using CuKα radiation with a voltage applied to an X-ray tube using a Cu target of 40 kv and a current value of 40 mA. When a sample contains a crystalline substance, a diffraction peak having a sharp shape appears in the X-ray diffraction pattern; the diffraction angle 2θ of the diffraction peak is determined from the powder X-ray diffraction pattern, the plane spacing d of the crystal is calculated based on the relationship $\lambda = 2d\sin\theta$, and the crystal system can thus be identified. In addition, the λ of CuKα radiation is 1.5406 angstrom.

When a sample is amorphous, there is no sharp peak in the X-ray diffraction pattern, suggesting that no crystalline component is contained. Even for an amorphous sample, a broad peak often appears between diffraction angles 2θ=20° to 40° of the X-ray diffraction pattern, but this does not mean that crystals are present.

With regard to the inorganic ion adsorbent of the present invention, in powder X-ray diffraction measurement using CuKα radiation, the diffraction intensity of tetragonal tin oxide is at least 3% relative to the diffraction intensity of antimony pentoxide ($Sb_2O_5 \cdot 2H_2O$). It is not preferable for this relative diffraction intensity to be less than 3% since the adsorption performance for heavy metal ions deteriorates. The diffraction intensity is preferably at least 5%. The higher the content of tetragonal tin oxide, the more preferable it is, and one having a diffraction intensity of greater than 100 counts (diffraction angle 2θ=26.7° under the measurement conditions described below is preferable. The diffraction intensity is preferably at least 130 counts, more preferably at least 150 counts, and particularly preferably at least 200 counts.

The diffraction intensity of cubic antimony pentoxide of the inorganic ion adsorbent related to the present invention is no greater than 40% relative to the diffraction intensity of antimony pentoxide ($Sb_2O_5 \cdot 2H_2O$), and is preferably no greater than 35%. When this relative diffraction intensity exceeds 40%, the capture rate for heavy metal ions tends to decrease. With regard to a cubic antimony pentoxide phase contained in the inorganic ion adsorbent of the present invention, the diffraction intensity of the cubic antimony pentoxide is preferably no greater than 1500 counts (diffraction angle 2θ=14.8°) under measurement conditions that are described later. The diffraction intensity is preferably no greater than 1000 counts, and more preferably no greater than 500 counts. When the diffraction intensity exceeds 1500 counts, the capture rate for heavy metal ions tends to decrease.

The specific surface area of the inorganic ion adsorbent of the present invention may be measured by a known method such as a BET method, and the specific surface area when measured by a BET method involving nitrogen adsorption is preferably at least 100 $m^2/g$, and more preferably at least 150 $m^2/g$. When the specific surface area is less than 100 $m^2/g$, heavy metal ions cannot be captured efficiently. The upper limit for the specific surface area is usually 300 $m^2/g$. When the specific surface area exceeds 300 $m^2/g$, aggregation easily occurs, and the ion exchange rate might drop or the heat resistance might be degraded.

The ion exchange capacity of the inorganic ion adsorbent of the present invention may be measured using an aqueous solution of cobalt (II) nitrate hexahydrate. A specific measurement method is described later.

The cobalt ion exchange capacity of the inorganic ion adsorbent of the present invention is preferably at least 0.5 meq/g, more preferably at least 0.7 meq/g, and yet more preferably at least 1.0 meq/g. The reason why this range is preferable is because a sufficient effect can be obtained with a small amount thereof added.

The ion capture rate of the inorganic ion adsorbent of the present invention is carried out in order to confirm whether or not low concentrations of various ions can be captured in a short period of time. A specific measurement method is described later. The higher the ion capture rate, the more preferable it is, and when the amount of inorganic ion adsorbent used and the treatment efficiency are taken into account, it is preferable for the capture rate for all ions to be at least 90%, more preferably at least 93%, and yet more preferably at least 95%. When the ion capture rate is at least 90%, sufficient performance can be exhibited in practice.

A distribution coefficient (Kd) for various types of ions of the inorganic ion adsorbent of the present invention may be determined from the equation below using test results for the ion capture rate.

$$Kd = (C_0 - C) \times V / (C \times m)$$

[In the equation, $C_0$ is the initial ion concentration and C is the ion concentration after an adsorption test. V is the test solution volume and m is the ion adsorbent weight. The units for the distribution coefficient Kd are mL/g.]

The higher the distribution coefficient, the more preferable it is, and the distribution coefficient for all ions is preferably at least $1.0 \times 10^3$ mL/g, more preferably at least $1.5 \times 10^3$ mL/g, and yet more preferably at least $2.0 \times 10^3$ mL/g. When the distribution coefficient is at least $1.0 \times 10^3$ mL/g, heavy metal ions can be captured with a small amount.

2. Method for Producing Inorganic Ion Adsorbent

The inorganic ion adsorbent related to the present invention may be produced by mixing water and an aqueous solution comprising a tetravalent tin salt and a pentavalent antimony salt so as to form a precipitate and then carrying out aging by heating. In this process, the molar ratio (Sn/Sb)

of Sn in the tin salt and Sb in the antimony salt is 0.1 to 5, and in the precipitation step at least 100 times by mole of water is mixed relative to the total number of moles of Sn and Sb.

With regard to starting materials for obtaining the inorganic ion adsorbent of the present invention, those that have been conventionally used as starting materials for obtaining tin oxide or antimony oxide by a reaction in aqueous solution may be used. Specifically, as a starting material for tin, it is a tetravalent tin salt; examples include tin (IV) chloride and tin (IV) acetate, and among them tin (IV) chloride is preferable because of industrial availability. Furthermore, as a starting material for antimony, antimony pentachloride, etc. is used.

The molar ratio (Sn/Sb) of Sn in the tin salt and Sb in the antimony salt is 0.1 to 5, preferably 0.15 to 3, and more preferably 0.2 to 2.5. When the molar ratio is less than 0.1, cubic antimony pentoxide easily forms, and the ion capture capability might deteriorate. On the other hand, when the molar ratio exceeds 5, the ion exchange capacity decreases, and the ion capture capability might deteriorate.

It is necessary for the amount of water used in the precipitation step to be at least 100 times by mole relative to the total number of moles of Sn and Sb, preferably at least 150 times by mole, and more preferably at least 250 times by mole. When the amount of water in the precipitation step is less than 100 times by mole, there are cases in which a sufficient yield cannot be obtained, or cubic antimony pentoxide easily forms in the precipitation step to thus degrade the ion adsorption performance.

The temperature of the water in the precipitation step is not particularly limited, but is preferably 10° C. to 90° C., more preferably 20° C. to 80° C., and yet more preferably 30° C. to 70° C. When the temperature is within this range, a sufficient yield is obtained.

The inorganic ion adsorbent of the present invention is produced by carrying out an aging step subsequent to the precipitation step. The temperature of the aging step is preferably at least 50° C., more preferably at least 55° C., and yet more preferably at least 60° C. When it is less than 50° C., it is difficult to effect crystallization, and it might take a long time for aging. On the other hand, the upper limit for the temperature of the aging step is usually no greater than 200° C., and preferably no greater than 160° C. When the temperature is too high, not only is it disadvantageous in terms of production cost, but the ion capture performance might also deteriorate.

The inorganic ion adsorbent of the present invention is obtained by washing the precipitate after the aging step with deionized water and drying. With regard to the washing, it is preferable for it to comprise a step of washing the precipitate until the electrical conductivity of the filtrate becomes 400 μS/cm or less or the pH becomes 3 or greater. Washing is preferably carried out until the electrical conductivity of the filtrate becomes 200 μS/cm or less, and more preferably 150 μS/cm or less. The reason therefor is that a slurry containing the precipitate formed contains a large amount of hydrochloric acid; if washing is inadequate, hydrochloric acid is concentrated during drying, and cubic antimony pentoxide is easily produced. The temperature of the deionized water used for washing is preferably higher than 0° C. but no greater than 40° C., more preferably higher than 0° C. but no greater than 25° C., and yet more preferably higher than 0° C. but no greater than 15° C. When the temperature is within this range, hydrochloric acid can be removed efficiently.

The washed precipitate is further dried to remove water. Drying may be carried out at room temperature or may be carried out by heating in a drying oven. That is, any treatment may be carried out as long as surplus water is removed from the precipitate. The drying temperature is preferably 40° C. to 250° C., and more preferably 100° C. to 230° C. A drying method is not particularly limited, but drying is preferably carried out until the water content in the entire precipitate becomes no greater than 5%, more preferably no greater than 3%, and yet more preferably no greater than 1%.

The inorganic ion adsorbent of the present invention obtained above may be subjected to a grinding treatment according to the intended application so as to give a desired secondary particle size.

The secondary particle size of the inorganic ion adsorbent of the present invention may be determined by for example measuring using a laser diffraction type particle size distribution analyzer a sample that has been ultrasonically dispersed in deionized water and defining the median diameter on a volume basis as a representative value for the secondary particle size. The secondary particle size is preferably 0.1 to 50 μm, and more preferably 0.2 to 30 μm. When the secondary particle size is less than 0.1 μm, solid-liquid separation after adsorption of target ions sometimes becomes difficult. On the other hand, when it exceeds 50 μm, the adsorption rate sometimes becomes slow.

3. Method for Using Inorganic Ion Adsorbent

When a liquid comprising heavy metal ions is subjected to a treatment, etc. using the inorganic ion adsorbent of the present invention, the inorganic ion adsorbent of the present invention may be contacted with the liquid comprising heavy metal ions. A method of contacting the inorganic ion adsorbent of the present invention with a liquid is not particularly limited, and either a batch system or a continuous system may be used. Specific examples of the method for contacting the inorganic ion adsorbent of the present invention with a liquid include a method in which the inorganic ion adsorbent of the present invention is added to the liquid, the mixture is stirred so as to make contact with the liquid, and the inorganic ion adsorbent of the present invention is then separated and a method in which a column, etc. is charged with the inorganic ion adsorbent of the present invention, and the liquid is made to pass therethrough.

The time for which the inorganic ion adsorbent of the present invention is contacted with a liquid depends on the subject to be treated and cannot generally be determined, but it is from a few minutes to a few hours, and in some cases it is a few days. The temperature when the two are contacted is preferably at least 50° C. in order to increase the ion exchange rate.

With regard to the proportions of the liquid and the inorganic ion adsorbent of the present invention to be contacted with the liquid, the inorganic ion adsorbent is preferably at least 1.0 g per meq of heavy metal ions, and it may be adjusted as appropriate according to the conditions under which the heavy metal ions are adsorbed, such as for example the contact time between the inorganic ion adsorbent of the present invention and the liquid, the contact method, the contact temperature, the pH of the liquid, and the concentrations of heavy metal ions.

Furthermore, the inorganic ion adsorbent of the present invention may be reused after carrying out a treatment, etc. of a liquid comprising heavy metal ions by replacing adsorbed heavy metal ions with protons by means of an acid treatment, etc.

The newly found inorganic ion adsorbent has heat resistance and radiation resistance together with excellent properties in terms of adsorbing heavy metal ions such as Cr, Mn, Co, and Ni ions in particular. The inorganic ion adsorbent related to the present invention can adsorb said heavy metal ions even in a strongly acidic region and can therefore treat for example a radioactive nuclide-containing material such as effluent discharged from a nuclear power facility such as a nuclear power plant or a nuclear fuel reprocessing plant. Furthermore, in accordance with the method for producing an inorganic ion adsorbent of the present invention, a specific tin antimonate having a high specific surface area can be obtained in a stable state.

EXAMPLES

The present invention is explained below in further detail by reference to Examples and Comparative Examples, but the present invention should not be construed as being limited thereto. Parts and % in the description below are on a mass basis unless otherwise specified.

1. Evaluation Method
(1) Composition of Inorganic Ion Adsorbent
 a) Tin and antimony contents were measured using X-ray fluorescence equipment.
 b) An inorganic ion adsorbent was dried at 150° C. for 24 hours and cooled in a desiccator for 30 minutes or longer. This sample was subjected to thermogravimetric analysis up to 500° C., and the hydration level was calculated.
The composition of the inorganic ion adsorbent was determined from the measurement results in a) and b).
(2) Powder X-Ray Diffraction
Powder X-ray diffraction (hereinafter, abbreviated to 'XRD') measurement employed a BRUKER 'D8 ADVANCE'. An X-ray diffraction pattern was obtained using CuKα generated using a sealed Cu tube type X-ray source at an applied voltage of 40 kv and a current value of 40 mA. Detailed measurement conditions are given in Table 1.

TABLE 1

| | |
|---|---|
| X-ray source | Sealed X-ray source (Cu radiation source) 0.4*12 mm² Long Fine Focus |
| Rated value | 2.2 kV |
| Output used | 40 kV-40 mA (1.6 kW) |
| Goniometer radius | 280 mm |
| Sample stage | FlipStick_Twin_Twin-XE |
| 2θ range | 5° to 55° |
| Step width | 0.02° |
| Step time | 0.05 sec/step |
| Incident side solar slit | 2.5° |
| Anti-scatter slit | 10.5 mm |
| Curvature | 1.00 |
| Detector | LYNXEYE_XE |
| Detector slit width | 5.758 mm |
| Detector window width | 2.9° |

The results of XRD measurement showed that tetragonal tin oxide had diffraction intensities at diffraction angles 2θ in the vicinity of 26.7°, 33.9°, 38.1°, and 52.2°. Furthermore, cubic antimony pentoxide had strong diffraction intensities at diffraction angles 2θ in the vicinity of 14.8°, 28.5°, and 29.8°. As a crystalline standard sample, antimony pentoxide ($Sb_2O_5 \cdot 2H_2O$, product name 'IXE-300', Toagosei Co., Ltd.) was measured under the same conditions.
(3) Specific Surface Area
0.5 g of the inorganic ion adsorbent thus obtained was subjected to measurement of BET specific surface area using a Malvern 'AUTOSORB-1'. The results are shown in Table 3.

(4) Secondary Particle Size
0.1 g of the inorganic ion adsorbent thus obtained was dispersed in 10 mL of deionized water using ultrasound of 70 w for 30 sec. The slurry was subjected to measurement of particle size distribution using a Malvern 'Mastersizer 2000'. The volume basis median diameter of this measurement value was defined as the secondary particle size. The results are shown in Table 3.
(5) Ion Exchange Capacity
15.55 g of cobalt (II) nitrate hexahydrate was dissolved in 1 L of pure water. 50 mL of this aqueous solution and 1.0 g of a synthesized inorganic ion adsorbent were placed in a 100 mL polyethylene bottle and shaken at 40° C. for 24 hours, and the inorganic ion adsorbent was then filtered using a 0.2 µm membrane filter. Subsequently, the cobalt ion concentration in the filtrate was measured using a plasma emission spectrometer. The cobalt ion concentration obtained when the same procedure was carried out without adding the inorganic ion adsorbent was defined as the blank value, and the ion exchange capacity per g of the adsorbent was determined from the difference. The results are shown in Table 4.
(6) Ion Capture Rate and Distribution Coefficient
A test liquid was prepared by dissolving 0.0494 g of cobalt (II) nitrate hexahydrate, 0.0439 g of manganese (II) sulfate pentahydrate, 0.0513 g of chromium (III) chloride hexahydrate, and 0.0448 g of nickel (II) sulfate hexahydrate in 1 L of a 0.01 N aqueous solution of nitric acid. 30 mL of this test liquid and 0.30 g of the inorganic ion adsorbent were placed in a 100 mL polyethylene container and hermetically sealed, then mixed by shaking back-and-forth 10 times, and allowed to stand in a temperature-controlled chamber at 40° C. for 2 hours. Subsequently, the inorganic ion adsorbent was filtered using a 0.2 µm membrane filter, and the Co, Mn, Cr, and Ni ion concentrations in the filtrate were measured using a plasma emission spectrometer ('SPS770', Seiko Epson Corp.). The ion capture rate and the distribution coefficient Kd were calculated from these values and the ion concentrations before adsorption. The results are shown in Tables 4 and 5. The units for the distribution coefficient Kd are mL/g.
2. Production of Inorganic Ion Adsorbent and Evaluation

Example 1

A 200 mL beaker was charged with 52.10 g of a 50 mass % aqueous solution of tin tetrachloride, and 44.85 g of antimony pentachloride (Sn/Sb molar ratio=0.67) was slowly added and mixed while stirring. When this aqueous solution was added to 1512 g of hot water at 70° C., a precipitate formed (amount of water was 340 times by mole relative to total number of moles of Sn and Sb). Subsequently, this mixture was aged at 70° C. for 20 hours while stirring, and then cooled, and the mother liquor was removed by filtration. Subsequently, the residue was washed with ion-exchanged water (electrical conductivity of filtrate: 150 µS/cm), and dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent 1 represented by the compositional formula $SnO_2 \cdot 0.75Sb_2O_5 \cdot 1.0H_2O$. The absorbent thus obtained was subjected to measurement of the diffraction intensity of tetragonal $SnO_2$ and cubic $Sb_2O_5$ by XRD (FIG. 1). The peaks in FIG. 1 were attributed to tetragonal tin oxide, and the diffraction intensity at a diffraction angle 2θ in the vicinity of 26.7° was 225 counts. The ordinate in FIGS. 1 to 9 denotes X-ray diffraction intensity (units [counts]), and the abscissa denotes diffraction angle 2θ(units [°]).

Furthermore, evaluation of the inorganic ion adsorbent 1 thus obtained was carried out in terms of specific surface area, secondary particle size, ion exchange capacity, ion capture rate, and distribution coefficient (Tables 3 to 5).

Example 2

A 200 mL beaker was charged with 52.10 g of a 50 mass % aqueous solution of tin tetrachloride, and 44.85 g of antimony pentachloride (Sn/Sb molar ratio=0.67) was slowly added and mixed while stirring. When this aqueous solution was added to 1512 g of hot water at 70° C., a precipitate formed (amount of water was 340 times by mole relative to total number of moles of Sn and Sb). Subsequently, stirring was carried out for 30 minutes, about 70 mL of this slurry was separated and transferred to a 100 mL pressure vessel made of Teflon (registered trademark), and aging was carried out at 120° C. for 20 hours. After aging, cooling was carried out, and the mother liquor was removed by filtration. Subsequently, the residue was washed with ion-exchanged water (electrical conductivity of filtrate: 150 μS/cm) and then dried using a dryer at 110° C. for 24 hours. Furthermore, grinding was carried out using a grinder ('Rotor-Speed Mill', 12,000 rpm, sieve aperture 80 μm, Fritsch Japan Co., Ltd.), thus giving inorganic ion adsorbent 2 represented by the compositional formula $SnO_2 \cdot 0.75Sb_2O_5 \cdot 1.0H_2O$.

Figure 2:
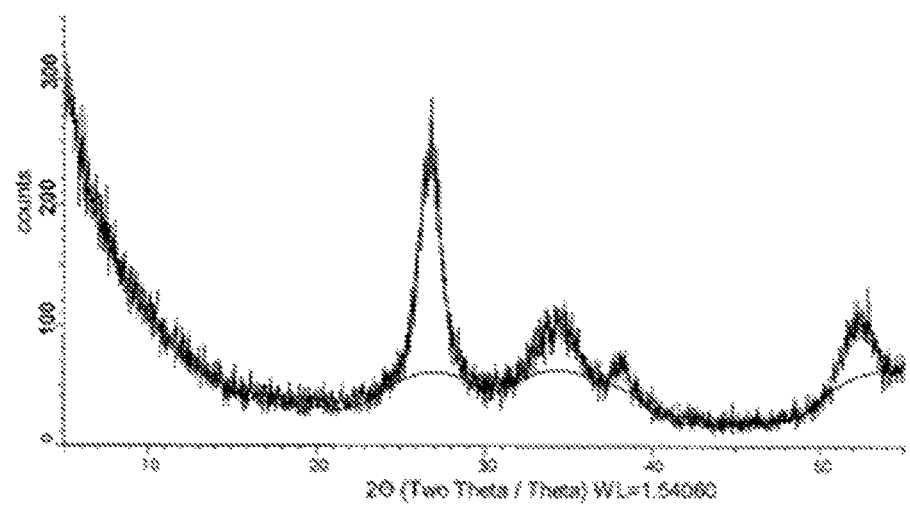
FIG. 2: An X-ray diffraction pattern of an inorganic ion adsorbent produced in Example 2.

When inorganic ion adsorbent 2 was subjected to XRD measurement, the peaks obtained were attributed to tetragonal tin oxide, and the diffraction intensity at a diffraction angle 2θ in the vicinity of 26.7° was 290 counts (FIG. 2). Furthermore, evaluation of the specific surface area, etc. of the inorganic ion adsorbent 2 obtained was carried out in the same manner as in Example 1.

Example 3

Inorganic ion adsorbent 3 represented by the compositional formula $SnO_2 \cdot 0.75Sb_2O_5 \cdot 1.0H_2O$ was obtained by carrying out the same procedure as in Example 2 except that aging was carried out at 150° C. for 20 hours.

When XRD measurement of inorganic ion adsorbent 3 was carried out, the peaks obtained were attributed to tetragonal tin oxide, and the diffraction intensity at a diffraction angle 2θ in the vicinity of 26.7° was 320 counts. Furthermore, evaluation of the specific surface area, etc. of the inorganic ion adsorbent 3 obtained was carried out in the same manner as in Example 1.

Example 4

A 200 mL beaker was charged with 52.10 g of a 50 mass % aqueous solution of tin tetrachloride, and 44.85 g of antimony pentachloride (Sn/Sb molar ratio=0.67) was slowly added and mixed while stirring. When this aqueous solution was added to 756 g of hot water at 70° C., a precipitate formed (amount of water was 170 times by mole relative to total number of moles of Sn and Sb). Subsequently, this mixture was aged at 70° C. for 20 hours while stirring and then cooled, and the mother liquor was removed by filtration. Subsequently, the residue was washed with ion-exchanged water (electrical conductivity of filtrate: 150 μS/cm), and dried using a dryer at 110° C. for 24 hours. Furthermore, grinding was carried out using a grinder ('Rotor-Speed Mill', 12,000 rpm, sieve aperture 80 μm, Fritsch Japan Co., Ltd.), thus giving inorganic ion adsorbent 4 represented by the compositional formula $SnO_2 \cdot 0.75Sb_2O_5 \cdot 1.0H_2O$.

Figure 3:
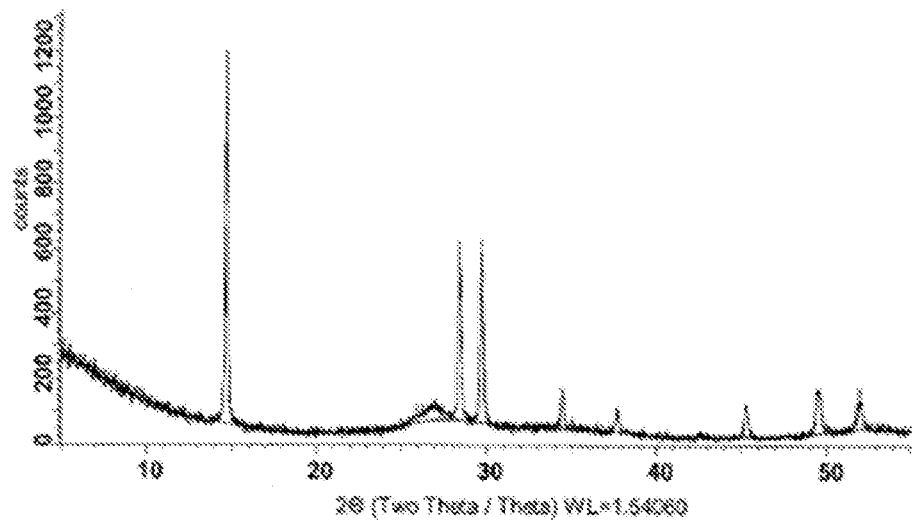
FIG. 3: An X-ray diffraction pattern of an inorganic ion adsorbent produced in Example 4.

When XRD measurement of inorganic ion adsorbent 4 was carried out, the peaks obtained were attributed to a mixture of tetragonal tin oxide and cubic antimony pentoxide; the diffraction intensity at a diffraction angle 2θ in the vicinity of 26.7° due to tin oxide was 135 counts, and the diffraction intensity at a diffraction angle 2θ in the vicinity of 14.8° due to cubic antimony pentoxide was 1200 (FIG. 3). Furthermore, evaluation of the specific surface area, etc. of the inorganic ion adsorbent 4 obtained was carried out in the same manner as in Example 1.

Example 5

A 200 mL beaker was charged with 35.50 g of anhydrous tin tetrachloride, 17.8 g of pure water was slowly added for dissolution while stirring, and 40.75 g of antimony pentachloride (Sn/Sb molar ratio=1) was then slowly added and mixed. When this aqueous solution was added to 1691 g of hot water at 70° C., a precipitate formed (amount of water was 340 times by mole relative to total number of moles of Sn and Sb). Subsequently, this mixture was aged at 70° C. for 20 hours while stirring and then cooled, and the mother liquor was removed by filtration. Subsequently, the residue was washed with ion-exchanged water (electrical conductivity of filtrate: 150 μS/cm), and dried using a dryer at 110° C. for 24 hours. Furthermore, grinding was carried out using a grinder ('Rotor-Speed Mill', 12,000 rpm, sieve aperture 80 μm, Fritsch Japan Co., Ltd.), thus giving inorganic ion adsorbent 5 represented by the compositional formula $SnO_2 \cdot 0.5Sb_2O_5 \cdot 0.8H_2O$.

When XRD measurement of inorganic ion adsorbent 5 was carried out, the peaks obtained were attributed to tetragonal tin oxide, and the diffraction intensity at a diffraction angle 2θ in the vicinity of 26.7° was 220 counts. Furthermore, evaluation of the specific surface area, etc. of the inorganic ion adsorbent 5 obtained was carried out in the same manner as in Example 1.

Example 6

A 200 mL beaker was charged with 47.30 g of anhydrous tin tetrachloride, 17.8 g of pure water was slowly added for dissolution while stirring, and 27.14 g of antimony pentachloride (Sn/Sb molar ratio=2) was then slowly added and mixed. When this aqueous solution was added to 1691 g of hot water at 70° C., a precipitate formed (amount of water was 340 times by mole relative to total number of moles of Sn and Sb). Subsequently, this mixture was aged at 70° C. for 20 hours while stirring and then cooled, and the mother liquor was removed by filtration. Subsequently, the residue was washed with ion-exchanged water (electrical conductivity of filtrate: 150 μS/cm), and dried using a dryer at 110° C. for 24 hours. Furthermore, grinding was carried out using a grinder ('Rotor-Speed Mill', 12,000 rpm, sieve aperture 80 μm, Fritsch Japan Co., Ltd.), thus giving inorganic ion adsorbent 6 represented by the compositional formula $SnO_2 \cdot 0.25Sb_2O_5 \cdot 0.3H_2O$.

When XRD measurement of inorganic ion adsorbent 6 was carried out, the peaks obtained were attributed to tetragonal tin oxide, and the diffraction intensity at a diffraction angle 2θ in the vicinity of 26.7° was 190 counts. Furthermore, evaluation of the specific surface area, etc. of the inorganic ion adsorbent 6 obtained was carried out in the same manner as in Example 1.

Example 7

A 200 mL beaker was charged with 22.18 g of a 50 mass % aqueous solution of tin tetrachloride, 8.38 g of pure water was added and, furthermore, 38.19 g of antimony pentachloride (Sn/Sb molar ratio=0.33) was slowly added and mixed while stirring. When this aqueous solution was added to 1543 g of hot water at 70° C., a precipitate formed (amount of water was 400 times by mole relative to total number of moles of Sn and Sb). Subsequently, this mixture was aged at 70° C. for 20 hours while stirring and then cooled, and the mother liquor was removed by filtration. Subsequently, the residue was washed with ion-exchanged water (electrical conductivity of filtrate: 150 µS/cm), and dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent 7 represented by the compositional formula $SnO_2 \cdot 1.5Sb_2O_5 \cdot 1.3H_2O$.

Figure 4:
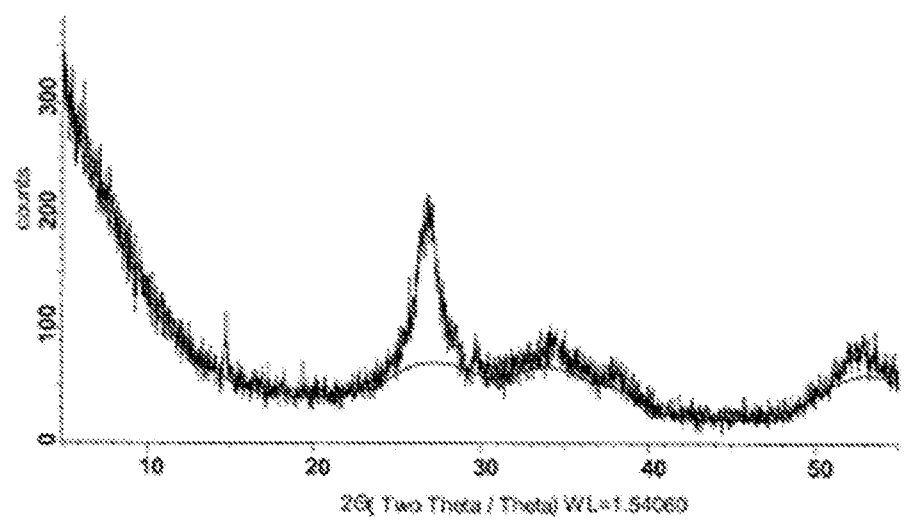
FIG. 4: An X-ray diffraction pattern of an inorganic ion adsorbent produced in Example 7.

When XRD measurement of inorganic ion adsorbent 7 was carried out, most of the peaks obtained were attributed to tetragonal tin oxide, the diffraction intensity at a diffraction angle $2\theta$ in the vicinity of 26.7° due to tin oxide was 220 counts, and the diffraction intensity at a diffraction angle $2\theta$ in the vicinity of 14.8° due to cubic antimony pentoxide was 110 counts (FIG. 4). Furthermore, evaluation of the specific surface area, etc. of the inorganic ion adsorbent 7 obtained was carried out in the same manner as in Example 1.

Example 8

A 200 mL beaker was charged with 15.23 g of a 50 mass % aqueous solution of tin tetrachloride, 14.91 g of pure water was added and, furthermore, 51.81 g of antimony pentachloride (Sn/Sb molar ratio=0.17) was slowly added and mixed while stirring. When this aqueous solution was added to 1593 g of hot water at 70° C., a precipitate formed (amount of water was 440 times by mole relative to total number of moles of Sn and Sb). Subsequently, this mixture was aged at 70° C. for 20 hours while stirring and then cooled, and the mother liquor was removed by filtration. Subsequently, the residue was washed with ion-exchanged water (electrical conductivity of filtrate: 150 µS/cm), and dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent 8 represented by the compositional formula $SnO_2 \cdot 3.1Sb_2O_5 \cdot 1.6H_2O$.

Figure 5:
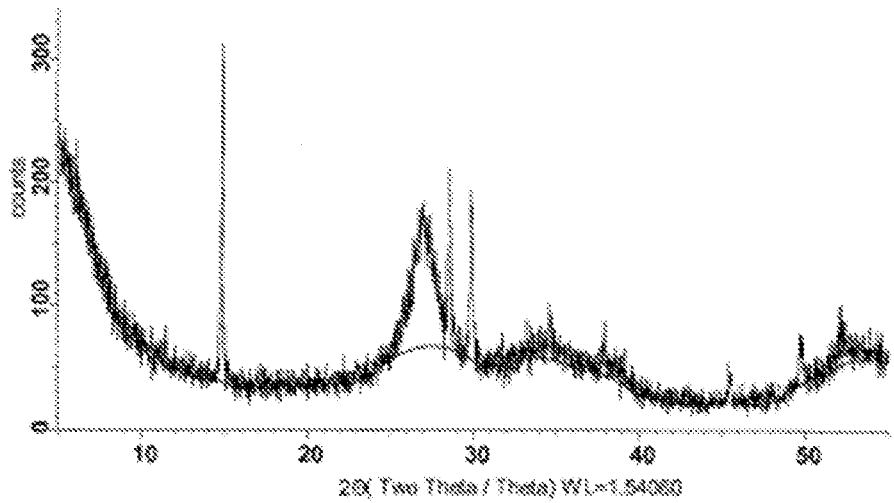
FIG. 5: An X-ray diffraction pattern of an inorganic ion adsorbent produced in Example 8.

When XRD measurement of inorganic ion adsorbent 8 was carried out, the peaks obtained were attributed to a mixture of tetragonal tin oxide and cubic antimony pentoxide; the diffraction intensity at a diffraction angle $2\theta$ in the vicinity of 26.7° due to tin oxide was 185 counts, and the diffraction intensity at a diffraction angle $2\theta$ in the vicinity of 14.8° due to cubic antimony pentoxide was 312 counts (FIG. 5). Furthermore, evaluation of the specific surface area, etc. of the inorganic ion adsorbent 8 obtained was carried out in the same manner as in Example 1.

Reference Example

Figure 6:
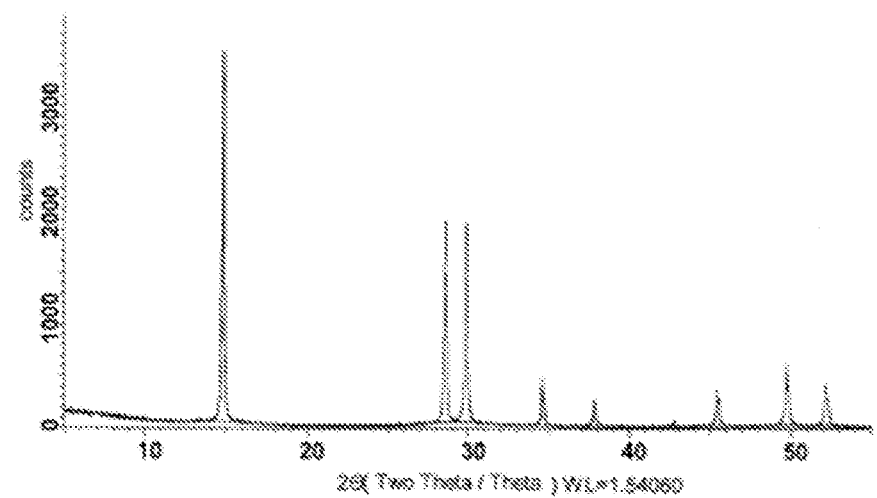
FIG. 6: An X-ray diffraction pattern of antimony pentoxide ($Sb_2O_5 \cdot 2H_2O$) as a reference example.

When, as a standard sample, XRD measurement of cubic antimony pentoxide ($Sb_2O_5 \cdot 2H_2O$, product name 'IXE-300', Toagosei Co., Ltd.) was carried out, the peaks obtained were attributed to cubic antimony pentoxide, and the diffraction intensity at a diffraction angle $2\theta$ in the vicinity of 14.8° due to cubic antimony pentoxide was 3600 counts (FIG. 6). Furthermore, evaluation of the specific surface area, etc. of this sample was carried out in the same manner as in Example 1.

Comparative Example 1

A 200 mL beaker was charged with 52.10 g of a 50 mass % aqueous solution of tin tetrachloride, and 44.85 g of antimony pentachloride (Sn/Sb molar ratio=0.67) was slowly added and mixed while stirring. When this aqueous solution was added to 756 g of hot water at 70° C. (amount of water was 170 times by mole relative to total number of moles of Sn and Sb), a precipitate formed. Subsequently, stirring was carried out for 30 minutes, about 70 mL of this slurry was separated and transferred to a 100 mL pressure vessel made of Teflon (registered trademark), and aging was carried out at 120° C. for 20 hours. After aging, cooling was carried out, and the mother liquor was removed by filtration. Subsequently, the residue was washed with ion-exchanged water (electrical conductivity of filtrate: 150 µS/cm) and then dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent A represented by the compositional formula $SnO_2 \cdot 0.75Sb_2O_5 \cdot 1.0H_2O$.

Figure 7:
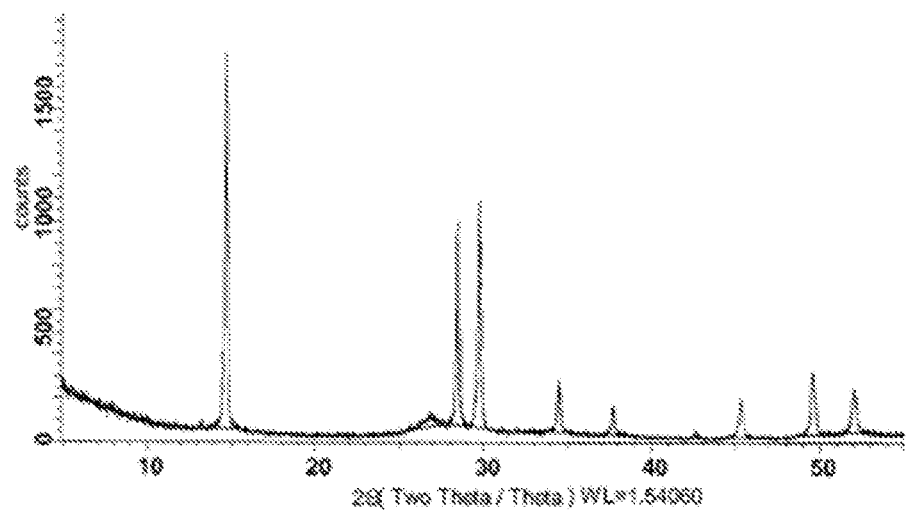
FIG. 7: An X-ray diffraction pattern of an inorganic ion adsorbent produced in Comparative Example 1.

When XRD measurement of inorganic ion adsorbent A was carried out, the peaks obtained were attributed to a mixture of tetragonal tin oxide and cubic antimony pentoxide; the diffraction intensity at a diffraction angle $2\theta$ in the vicinity of 26.7° due to tin oxide was 125 counts, and the diffraction intensity at a diffraction angle $2\theta$ in the vicinity of 14.8° due to cubic antimony pentoxide was 1750 counts (FIG. 7). Furthermore, evaluation of the specific surface area, etc. of the inorganic ion adsorbent A obtained was carried out in the same manner as in Example 1.

Comparative Example 2

A 200 mL beaker was charged with 52.10 g of a 50 mass % aqueous solution of tin tetrachloride, and 44.85 g of antimony pentachloride (Sn/Sb molar ratio=0.67) was slowly added and mixed while stirring. When this aqueous solution was added to 378 g of hot water at 70° C. (amount of water was 85 times by mole relative to total number of moles of Sn and Sb), a precipitate formed. Subsequently, this mixture was aged at 70° C. for 20 hours while stirring and then cooled, and the mother liquor was removed by filtration. Subsequently, the residue was washed with ion-exchanged water (electrical conductivity of filtrate: 150 µS/cm), and dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent B represented by the compositional formula $SnO_2 \cdot 0.75 Sb_2O_5 \cdot 1.0H_2O$.

When XRD measurement of inorganic ion adsorbent B was carried out, the peaks obtained were attributed to a mixture of tetragonal tin oxide and cubic antimony pentoxide; the diffraction intensity at a diffraction angle $2\theta$ in the vicinity of 26.7° due to tin oxide was 60 counts, and the diffraction intensity at a diffraction angle $2\theta$ in the vicinity of 14.8° due to cubic antimony pentoxide was 1800 counts. Furthermore, evaluation of the specific surface area, etc. of the inorganic ion adsorbent B obtained was carried out in the same manner as in Example 1.

Comparative Example 3

A 200 mL beaker was charged with 52.10 g of a 50 mass % aqueous solution of tin tetrachloride, and 44.85 g of antimony pentachloride (Sn/Sb molar ratio=0.67) was slowly added and mixed while stirring. When this aqueous solution was added to 378 g of hot water at 70° C. (amount of water was 85 times by mole relative to total number of moles of Sn and Sb), a precipitate formed. Subsequently, stirring was carried out for 30 minutes, about 70 mL of this slurry was separated and transferred to a 100 mL pressure vessel made of Teflon (registered trademark), and aging was carried out at 120° C. for 20 hours. After aging, cooling was carried out, and the mother liquor was removed by filtration. Subsequently, the residue was washed with ion-exchanged water (electrical conductivity of filtrate: 150 µS/cm) and then dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent C represented by the compositional formula $SnO_2 \cdot 0.75Sb_2O_5 \cdot 1.0H_2O$.

Figure 8:
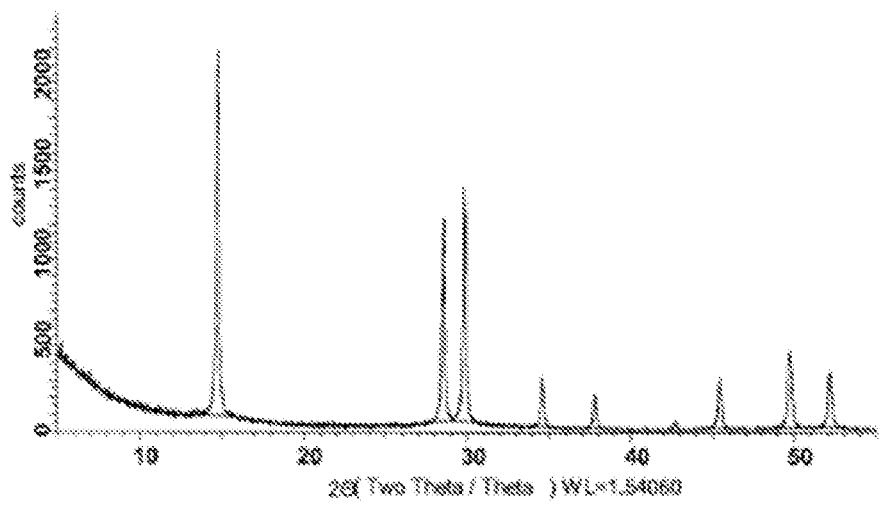
FIG. 8: An X-ray diffraction pattern of an inorganic ion adsorbent produced in Comparative Example 3.

When XRD measurement of inorganic ion adsorbent C was carried out, the peaks obtained were attributed to cubic antimony pentoxide, and the diffraction intensity at a diffraction angle 2θ in the vicinity of 14.8° due to cubic antimony pentoxide was 2200 counts (FIG. 8). Furthermore, evaluation of the specific surface area, etc. of the inorganic ion adsorbent C obtained was carried out in the same manner as in Example 1.

Comparative Example 4

A 200 mL beaker was charged with 52.0 g of anhydrous tin tetrachloride, 7.8 g of pure water was slowly added for dissolution while stirring and, furthermore, 17.94 g of antimony pentachloride (Sn/Sb molar ratio=3.3) was slowly added while stirring. When this aqueous solution was added to 1691 g of hot water at 70° C. (amount of water was 360 times by mole relative to total number of moles of Sn and Sb), a precipitate formed. Subsequently, this mixture was aged at 70° C. for 20 hours while stirring and then cooled, and the mother liquor was removed by filtration. Subsequently, the residue was washed with ion-exchanged water (electrical conductivity of filtrate: 150 µS/cm), and dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent D represented by the compositional formula $SnO_2 \cdot 0.15Sb_2O_5 \cdot 0.2H_2O$.

When XRD measurement of inorganic ion adsorbent D was carried out, the peaks obtained were attributed to tetragonal tin oxide, and the diffraction intensity at a diffraction angle 2θ in the vicinity of 26.7° was 160 counts. Furthermore, evaluation of the specific surface area, etc. of the inorganic ion adsorbent D obtained was carried out in the same manner as in Example 1.

Comparative Example 5

A 200 mL beaker was charged with 52.0 g of anhydrous tin tetrachloride, and 5.2 g of pure water was slowly added for dissolution while stirring. Furthermore, 11.96 g of antimony pentachloride (Sn/Sb molar ratio=5) was slowly added and mixed while stirring. When this aqueous solution was added to 1691 g of hot water at 70° C. (amount of water was 390 times by mole relative to total number of moles of Sn and Sb), a precipitate formed. Subsequently, this mixture was aged at 70° C. for 20 hours while stirring and then cooled, and the mother liquor was removed by filtration. Subsequently, the residue was washed with ion-exchanged water (electrical conductivity of filtrate: 150 µS/cm), and dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent E represented by the compositional formula $SnO_2 \cdot 0.1Sb_2O_5 \cdot 0.1H_2O$.

When XRD measurement of inorganic ion adsorbent E was carried out, the peaks obtained were attributed to tetragonal tin oxide, and the diffraction intensity at a diffraction angle 2θ in the vicinity of 26.7° was 120 counts. Furthermore, evaluation of the specific surface area, etc. of the inorganic ion adsorbent E obtained was carried out in the same manner as in Example 1.

Comparative Example 6

A 200 mL beaker was charged with 15.23 g of a 50 mass % aqueous solution of tin tetrachloride, 14.91 g of pure water was added and, furthermore, 51.81 g of antimony pentachloride (Sn/Sb molar ratio=0.17) was slowly added and mixed while stirring. When this aqueous solution was added to 796 g of hot water at 70° C. (amount of water was 200 times by mole relative to total number of moles of Sn and Sb), a precipitate formed. Subsequently, this mixture was aged at 70° C. for 20 hours while stirring and then cooled, and the mother liquor was removed by filtration. Subsequently, the residue was washed with ion-exchanged water (electrical conductivity of filtrate: 150 µS/cm), and dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent F represented by the compositional formula $SnO_2 \cdot 3.1Sb_2O_5 \cdot 1.6H_2O$.

When XRD measurement of inorganic ion adsorbent F was carried out, the peaks obtained were attributed to a mixture of tetragonal tin oxide and cubic antimony pentoxide; the diffraction intensity at a diffraction angle 2θ in the vicinity of 26.7° due to tin oxide was 110 counts, and the diffraction intensity at a diffraction angle 2θ in the vicinity of 14.8° due to cubic antimony pentoxide was 1600 counts. Furthermore, evaluation of the specific surface area, etc. of the inorganic ion adsorbent F obtained was carried out in the same manner as in Example 1.

Comparative Example 7

1 L of 6 N hydrochloric acid was prepared by adding pure water to 608 g of 36% hydrochloric acid to make 1 L. Furthermore, 6 N hydrochloric acid was added to 6.51 g of anhydrous tin chloride to make 250 mL, thus preparing a 0.1 M tin chloride liquid. Subsequently, 6 N hydrochloric acid was added to 7.48 g of antimony pentachloride to make 250 mL, thus preparing a 0.1 M antimony chloride solution. The tin chloride solution and the antimony chloride solution thus prepared were placed in a 1 L 3-necked flask and stirred and mixed. Furthermore, 25% aqueous ammonia was slowly added dropwise while stirring until the pH became 2 (about 220 mL). After completion of the dropwise addition, stirring was carried out for 30 minutes, and when the pH was checked, the pH was 2.1 and stable. The mother liquor was removed by filtration from the material thus synthesized. Subsequently, the residue was washed with ion-exchanged water and then dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent G represented by the compositional formula $SnO_2 \cdot 0.25Sb_2O_5 \cdot 0.3H_2O$.

Figure 9:
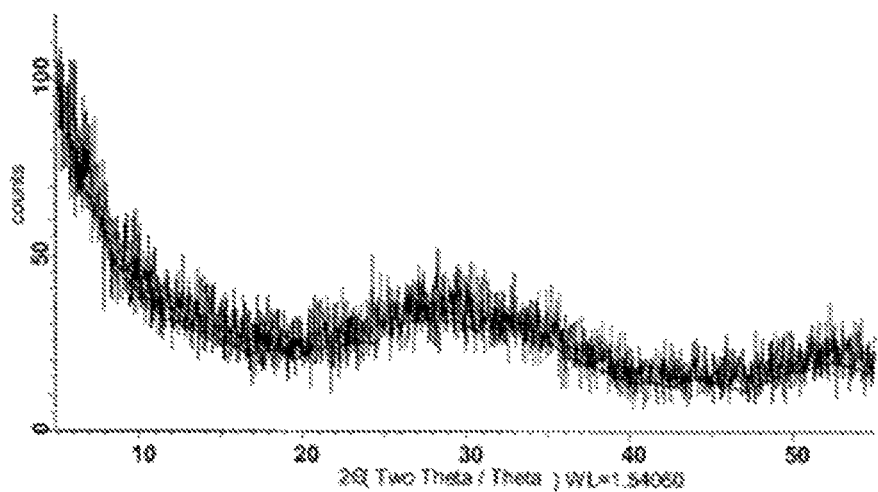
FIG. 9: An X-ray diffraction pattern of an inorganic ion adsorbent produced in Comparative Example 7.

When XRD measurement of inorganic ion adsorbent G was carried out, there were no peaks obtained, and it was presumed to be an amorphous compound (FIG. 9). Furthermore, evaluation of the specific surface area, etc. of the inorganic ion adsorbent G obtained was carried out in the same manner as in Example 1.

Comparative Example 8

A 200 mL beaker was charged with 10.0 g of a 50 mass % aqueous solution of tin tetrachloride, 24.0 g of pure water was added and, furthermore, 56.0 g of antimony pentachloride (Sn/Sb molar ratio=0.1) was slowly added and mixed while stirring. When this aqueous solution was added to 1350 g of hot water at 70° C. (amount of water was 440 times by mole relative to total number of moles of Sn and Sb), a precipitate formed. Subsequently, this mixture was aged at 70° C. for 20 hours while stirring and then cooled, and the mother liquor was removed by filtration. Subsequently, the residue was washed with ion-exchanged water (electrical conductivity of filtrate: 150 µS/cm), and dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent H represented by the compositional formula $SnO_2 \cdot 4.9Sb_2O_5 \cdot 4.5H_2O$.

When XRD measurement of inorganic ion adsorbent H was carried out, the peaks obtained were attributed to cubic antimony pentoxide, and the diffraction intensity at a diffraction angle $2\theta$ in the vicinity of 14.8° due to cubic antimony pentoxide was 2900 counts. Furthermore, evaluation of the specific surface area, etc. of the inorganic ion adsorbent H obtained was carried out in the same manner as in Example 1.

Comparative Example 9

A 200 mL beaker was charged with 7.0 g of a 50 mass % aqueous solution of tin tetrachloride, 24.0 g of pure water was added and, furthermore, 56.0 g of antimony pentachloride (Sn/Sb molar ratio=0.07) was slowly added and mixed while stirring. When this aqueous solution was added to 1350 g of hot water at 70° C. (amount of water was 450 times by mole relative to total number of moles of Sn and Sb), a precipitate formed. Subsequently, this mixture was aged at 70° C. for 20 hours while stirring and then cooled, and the mother liquor was removed by filtration. Subsequently, the residue was washed with ion-exchanged water (electrical conductivity of filtrate: 150 µS/cm), and dried using a dryer at 110° C. for 24 hours. Furthermore, grinding was carried out using a grinder ('Rotor-Speed Mill', 12,000 rpm, sieve aperture 80 µm, Fritsch Japan Co., Ltd.), thus giving inorganic ion adsorbent H represented by the compositional formula $SnO_2 \cdot 7.0Sb_2O_5 \cdot 5.8H_2O$.

When XRD measurement of inorganic ion adsorbent I was carried out, the peaks obtained were attributed to cubic antimony pentoxide, and the diffraction intensity at a diffraction angle $2\theta$ in the vicinity of 14.8° due to cubic antimony pentoxide was 3200 counts. Furthermore, evaluation of the specific surface area, etc. of the inorganic ion adsorbent I obtained was carried out in the same manner as in Example

TABLE 2

| Type of inorganic ion adsorbent | | $SnO_2$ intensity (counts) | $SnO_2$ relative intensity (%) | $Sb_2O_5$ intensity (counts) | $Sb_2O_5$ relative intensity (%) |
|---|---|---|---|---|---|
| Example 1 | Adsorbent 1 | 225 | 6.3 | 0 | 0 |
| Example 2 | Adsorbent 2 | 290 | 8.1 | 0 | 0 |
| Example 3 | Adsorbent 3 | 320 | 8.9 | 0 | 0 |
| Example 4 | Adsorbent 4 | 135 | 3.8 | 1200 | 33 |
| Example 5 | Adsorbent 5 | 220 | 6.1 | 0 | 0 |
| Example 6 | Adsorbent 6 | 190 | 5.3 | 0 | 0 |
| Example 7 | Adsorbent 7 | 220 | 6.1 | 110 | 3 |
| Example 8 | Adsorbent 8 | 185 | 5.1 | 312 | 9 |
| Reference Example | IXE-300 | 0 | 0 | 3600 | 100 |
| Comparative Example 1 | Adsorbent A | 125 | 3.5 | 1750 | 49 |
| Comparative Example 2 | Adsorbent B | 60 | 1.7 | 1800 | 50 |
| Comparative Example 3 | Adsorbent C | 0 | 0 | 2200 | 61 |
| Comparative Example 4 | Adsorbent D | 160 | 4.4 | 0 | 0 |
| Comparative Example 5 | Adsorbent E | 120 | 3.3 | 0 | 0 |
| Comparative Example 6 | Adsorbent F | 110 | 3.1 | 1600 | 44 |
| Comparative Example 7 | Adsorbent G | Amorphous | 0 | 0 | — |
| Comparative Example 8 | Adsorbent H | 0 | 0 | 2900 | 81 |
| Comparative Example 9 | Adsorbent I | 0 | 0 | 3200 | 89 |

TABLE 3

| Type of Inorganic ion adsorbent | | Specific surface area ($m^2/g$) | Secondary particle diameter (µm) |
|---|---|---|---|
| Example 1 | Adsorbent 1 | 180 | 16.5 |
| Example 2 | Adsorbent 2 | 260 | 6.5 |
| Example 3 | Adsorbent 3 | 280 | 5.8 |
| Example 4 | Adsorbent 4 | 110 | 3.4 |
| Example 5 | Adsorbent 5 | 180 | 17.0 |
| Example 6 | Adsorbent 6 | 170 | 16.7 |
| Example 7 | Adsorbent 7 | 150 | 14.8 |
| Example 8 | Adsorbent 8 | 120 | 11.3 |
| Reference Example | IXE-300 | 7.7 | 0.5 |
| Comparative Example 1 | Adsorbent A | 85 | 3.3 |
| Comparative Example 2 | Adsorbent B | 11 | 1.6 |
| Comparative Example 3 | Adsorbent C | 13 | 6.8 |
| Comparative Example 4 | Adsorbent D | 150 | 17.6 |
| Comparative Example 5 | Adsorbent E | 110 | 16.8 |
| Comparative Example 6 | Adsorbent F | 63 | 9.7 |
| Comparative Example 7 | Adsorbent G | 300 | 23.3 |
| Comparative Example 8 | Adsorbent H | 8.8 | 1.1 |
| Comparative Example 9 | Adsorbent I | 8.4 | 0.8 |

TABLE 4

| | Type of inorganic ion adsorbent | Co exchange capacity | Co Capture rate | Mn Capture rate | Cr Capture rate | Ni Capture rate |
|---|---|---|---|---|---|---|
| Example 1 | Adsorbent 1 | 1.2 | 99.7% | 99.3% | 95.5% | 98.0% |
| Example 2 | Adsorbent 2 | 1.3 | 99.6% | 99.6% | 96.1% | 99.6% |
| Example 3 | Adsorbent 3 | 1.3 | 99.6% | 99.3% | 96.7% | 99.8% |
| Example 4 | Adsorbent 4 | 1.3 | 98.8% | 98.3% | 94.6% | 91.1% |
| Example 5 | Adsorbent 5 | 1.1 | 99.8% | 99.5% | 95.9% | 99.1% |
| Example 6 | Adsorbent 6 | 0.8 | 98.6% | 95.4% | 94.0% | 90.9% |
| Example 7 | Adsorbent 7 | 1.4 | 99.3% | 99.3% | 96.0% | 99.4% |
| Example 8 | Adsorbent 8 | 1.4 | 98.1% | 98.5% | 95.3% | 95.5% |
| Reference Example 1 | IXE-300 | 0.1 | 0.2% | 27.9% | 1.8% | 0.8% |
| Comparative Example 1 | Adsorbent A | 0.8 | 93.3% | 88.4% | 92.9% | 79.4% |
| Comparative Example 2 | Adsorbent B | 0.2 | 27.3% | 67.3% | 48.1% | 12.1% |
| Comparative Example 3 | Adsorbent C | 0.4 | 33.2% | 75.2% | 55.0% | 21.0% |
| Comparative Example 4 | Adsorbent D | 0.5 | 76.3% | 84.6% | 72.3% | 66.0% |
| Comparative Example 5 | Adsorbent E | 0.3 | 52.1% | 78.3% | 60.1% | 46.0% |
| Comparative Example 6 | Adsorbent F | 0.9 | 88.0% | 85.9% | 74.5% | 70.6% |
| Comparative Example 7 | Adsorbent G | 0.6 | 68.4% | 73.1% | 59.2% | 50.7% |
| Comparative Example 8 | Adsorbent H | 0.2 | 26.3% | 49.6% | 37.6% | 24.8% |
| Comparative Example 9 | Adsorbent I | 0.2 | 5.9% | 42.4% | 15.5% | 8.8% |

TABLE 5

| | Type of Inorganic ion adsorbent | Co Distribution co-efficient | Mn Distribution co-efficient | Cr Distribution co-efficient | Ni Distribution co-efficient |
|---|---|---|---|---|---|
| Example 1 | Adsorbent 1 | $3.3 \times 10^4$ | $1.4 \times 10^4$ | $2.1 \times 10^3$ | $5.0 \times 10^3$ |
| Example 2 | Adsorbent 2 | $2.2 \times 10^4$ | $2.6 \times 10^4$ | $2.5 \times 10^3$ | $2.5 \times 10^4$ |
| Example 3 | Adsorbent 3 | $2.6 \times 10^4$ | $1.4 \times 10^4$ | $2.9 \times 10^3$ | $5.0 \times 10^4$ |
| Example 4 | Adsorbent 4 | $8.1 \times 10^3$ | $5.6 \times 10^3$ | $1.8 \times 10^3$ | $1.0 \times 10^3$ |
| Example 5 | Adsorbent 5 | $4.5 \times 10^4$ | $2.0 \times 10^4$ | $2.3 \times 10^3$ | $1.1 \times 10^4$ |
| Example 6 | Adsorbent 6 | $6.8 \times 10^3$ | $2.1 \times 10^3$ | $1.6 \times 10^3$ | $1.0 \times 10^3$ |
| Example 7 | Adsorbent 7 | $1.4 \times 10^4$ | $1.4 \times 10^4$ | $2.4 \times 10^3$ | $2.4 \times 10^4$ |
| Example 8 | Adsorbent 8 | $5.1 \times 10^3$ | $6.6 \times 10^3$ | $2.0 \times 10^3$ | $2.1 \times 10^3$ |
| Reference Example 1 | IXE-300 | $2.0 \times 10$ | $3.9 \times 10$ | 1.8 | $8.0 \times 10$ |
| Comparative Example 1 | Adsorbent A | $1.4 \times 10^3$ | $7.6 \times 10^2$ | $1.3 \times 10^3$ | $3.9 \times 10^3$ |
| Comparative Example 2 | Adsorbent B | $3.7 \times 10$ | $2.1 \times 10^2$ | $9.3 \times 10$ | $1.4 \times 10$ |
| Comparative Example 3 | Adsorbent C | $5.0 \times 10$ | $3.0 \times 10^2$ | $1.2 \times 10^2$ | $2.7 \times 10$ |
| Comparative Example 4 | Adsorbent D | $3.2 \times 10^2$ | $5.5 \times 10^2$ | $2.6 \times 10^2$ | $1.9 \times 10^2$ |
| Comparative Example 5 | Adsorbent E | $1.1 \times 10^2$ | $3.6 \times 10^2$ | $1.5 \times 10^2$ | $8.5 \times 10$ |
| Comparative Example 6 | Adsorbent F | $7.3 \times 10^2$ | $6.1 \times 10^3$ | $2.9 \times 10^2$ | $2.4 \times 10^2$ |
| Comparative Example 7 | Adsorbent G | $2.2 \times 10^2$ | $2.7 \times 10^2$ | $1.5 \times 10^2$ | $1.0 \times 10^2$ |
| Comparative Example 8 | Adsorbent H | $3.6 \times 10$ | $9.8 \times 10$ | $6.0 \times 10$ | $3.3 \times 10$ |
| Comparative Example 9 | Adsorbent I | 6.3 | $7.4 \times 10$ | $1.8 \times 10$ | 9.6 |

As is clear from Tables 3 to 5, the inorganic ion adsorbent of the present invention has a capture rate for heavy metal ions such as Co, Mn, Cr, and Ni as high as 90% or greater and excellent adsorption properties.

Industrial Applicability

The present invention is an adsorbent that has heat resistance and radiation resistance together with excellent properties in terms of adsorbing heavy metal ions such as Cr, Mn, Co, and Ni ions in particular and is useful for the treatment of effluent from for example a plating factory, an industrial waste disposal facility, etc. Furthermore, it is useful for the treatment of a radioactive nuclide-containing substance such as effluent discharged from a nuclear power facility such as a nuclear power plant or a nuclear fuel reprocessing plant.

What is claimed is:

1. An inorganic ion adsorbent represented by Formula (1) below, wherein in powder X-ray diffraction measurement using CuKα radiation, the diffraction intensity of tetragonal tin oxide is at least 3% relative to the diffraction intensity of antimony pentoxide ($Sb_2O_5 \cdot 2H_2O$), and the diffraction intensity of cubic antimony pentoxide is no greater than 40% relative to the diffraction intensity of antimony pentoxide ($Sb_2O_5 \cdot 2H_2O$), $$SnO_2 \cdot aSb_2O_5 \cdot nH_2O \quad (1)$$

wherein in the Formula, $\underline{a}$ denotes a number that satisfies $0.2 \leq a \leq 4$ and n denotes hydration number and is 0 or a positive number.

2. The inorganic ion adsorbent according to claim 1, wherein the specific surface area measured by a BET method is at least 100 $m^2/g$.

3. A method for producing the inorganic ion adsorbent according to claim 1, the method comprising a precipitation step of forming a precipitate by mixing water and an aqueous solution comprising a tetravalent tin salt and a pentavalent antimony salt, and an aging step of carrying out aging by heating, wherein the molar ratio (Sn/Sb) of Sn in the tin salt and Sb in the antimony salt is 0.1 to 5, and in the precipitation step at least 100 times by mole of water is mixed relative to the total number of moles of Sn and Sb.

4. The method for producing an inorganic ion adsorbent according to claim 3, wherein the temperature in the aging step is at least 50° C.

* * * * *